United States Patent [19]

Marion

[11] 3,980,592
[45] Sept. 14, 1976

[54] RECOVERY OF PARTICULATE CARBON FROM SYNTHESIS GAS

[75] Inventor: Charles P. Marion, Mamaroneck, N.Y.

[73] Assignee: Texaco Development Corporation, New York, N.Y.

[22] Filed: Dec. 23, 1974

[21] Appl. No.: 535,607

[52] U.S. Cl.............................. 252/373; 48/196 R; 48/197 R; 48/212; 48/215; 260/449 R; 260/449.6; 260/604 HF
[51] Int. Cl.²......................................... C01B 2/14
[58] Field of Search....... 252/373; 48/196 R, 197 R, 48/212, 215

[56] References Cited
UNITED STATES PATENTS

| | | | |
|---|---|---|---|
| 2,987,386 | 6/1961 | Chapman et al................. | 48/191 R |
| 2,992,906 | 7/1961 | Guptill......................... | 252/373 UX |
| 2,999,741 | 9/1961 | Dille et al..................... | 48/196 R |
| 3,473,903 | 10/1969 | Paull et al..................... | 48/212 |
| 3,846,095 | 11/1974 | Crouch.......................... | 252/373 X |
| 3,868,817 | 3/1975 | Marion et al.................... | 252/373 U |

*Primary Examiner*—Howard T. Mars
*Attorney, Agent, or Firm*—T. H. Whaley; C. G. Ries; Albert Brent

[57] ABSTRACT

A process for recovering particulate carbon from the effluent gas stream from a partial oxidation synthesis gas generator by scrubbing the effluent gas with water in a scrubbing zone to form a carbon-water dispersion, mixing said dispersion in mixing and separating zones with a light liquid hydrocarbon fuel fraction extractant to produce a clarified water layer and a carbon-liquid hydrocarbon fuel dispersion, separating and recycling said clarified water to said scrubbing zone; separating said carbon light liquid hydrocarbon fuel dispersion and introducing same into a centrifugal separation zone; separately withdrawing from said centrifugal separation zone a thick stream of carbon-liquid hydrocarbon fuel dispersion and a separate thin stream of carbon-liquid hydrocarbon fuel dispersion; degasifying said clean centrifugal stream and introducing said thin centrifugal stream into said mixing and separating zone as a portion of said light liquid hydrocarbon fuel extractant, intoducing said thick stream of carbon-liquid hydrocarbon fuel dispersion in admixture with fresh heavy liquid hydrocarbon fuel e.g. heavy fuel oil into a fractional distillation zone; recycling a light liquid hydrocarbon fuel fraction from said distillation zone to said mixing zone as a portion of said light liquid hydrocarbon fuel extractant, and intoducing a pumpable bottoms slurry of carbon heavy liquid hydrocarbon fuel from said distillation zone into said synthesis gas generator as at least a portion of the fuel.

11 Claims, 2 Drawing Figures

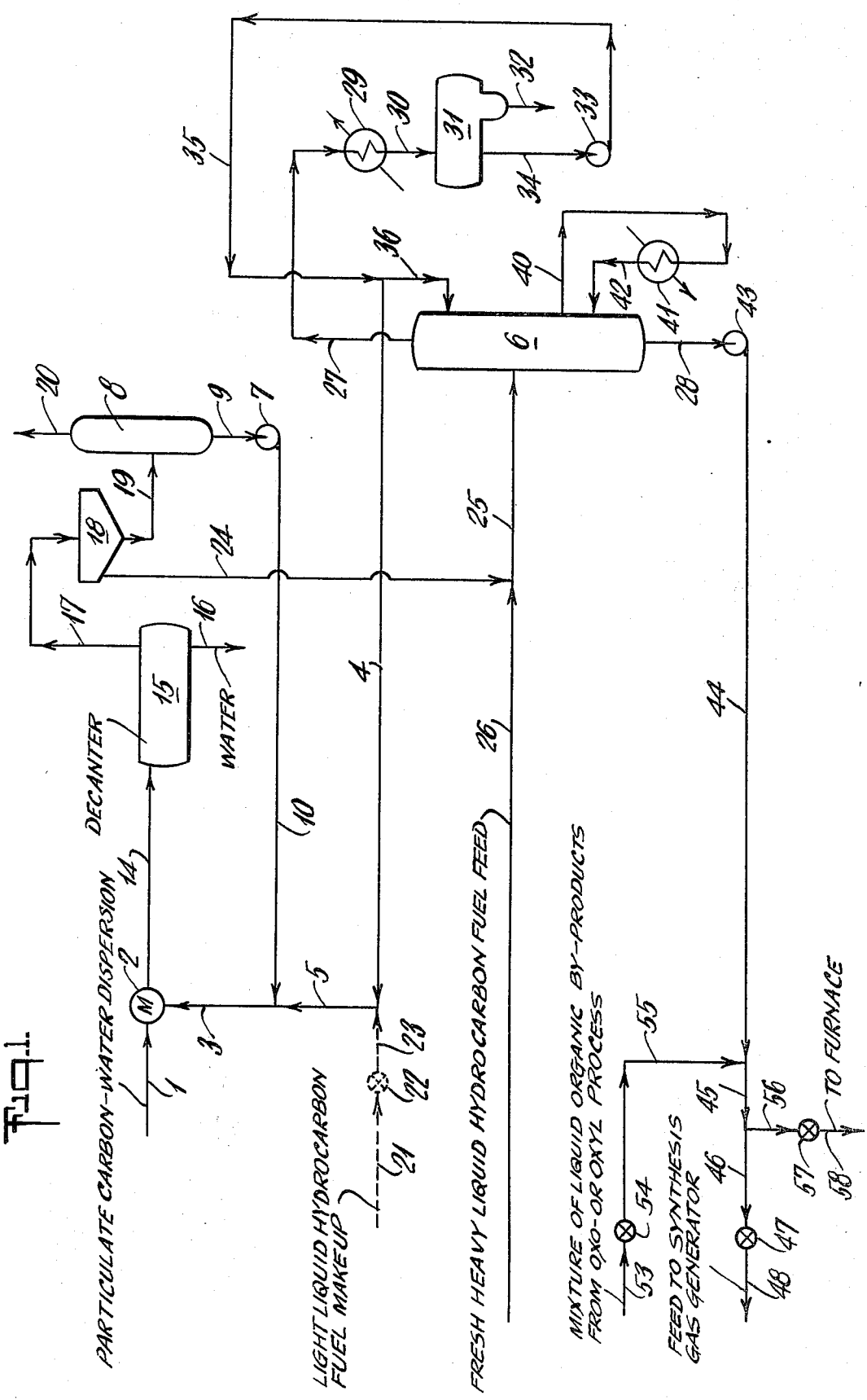

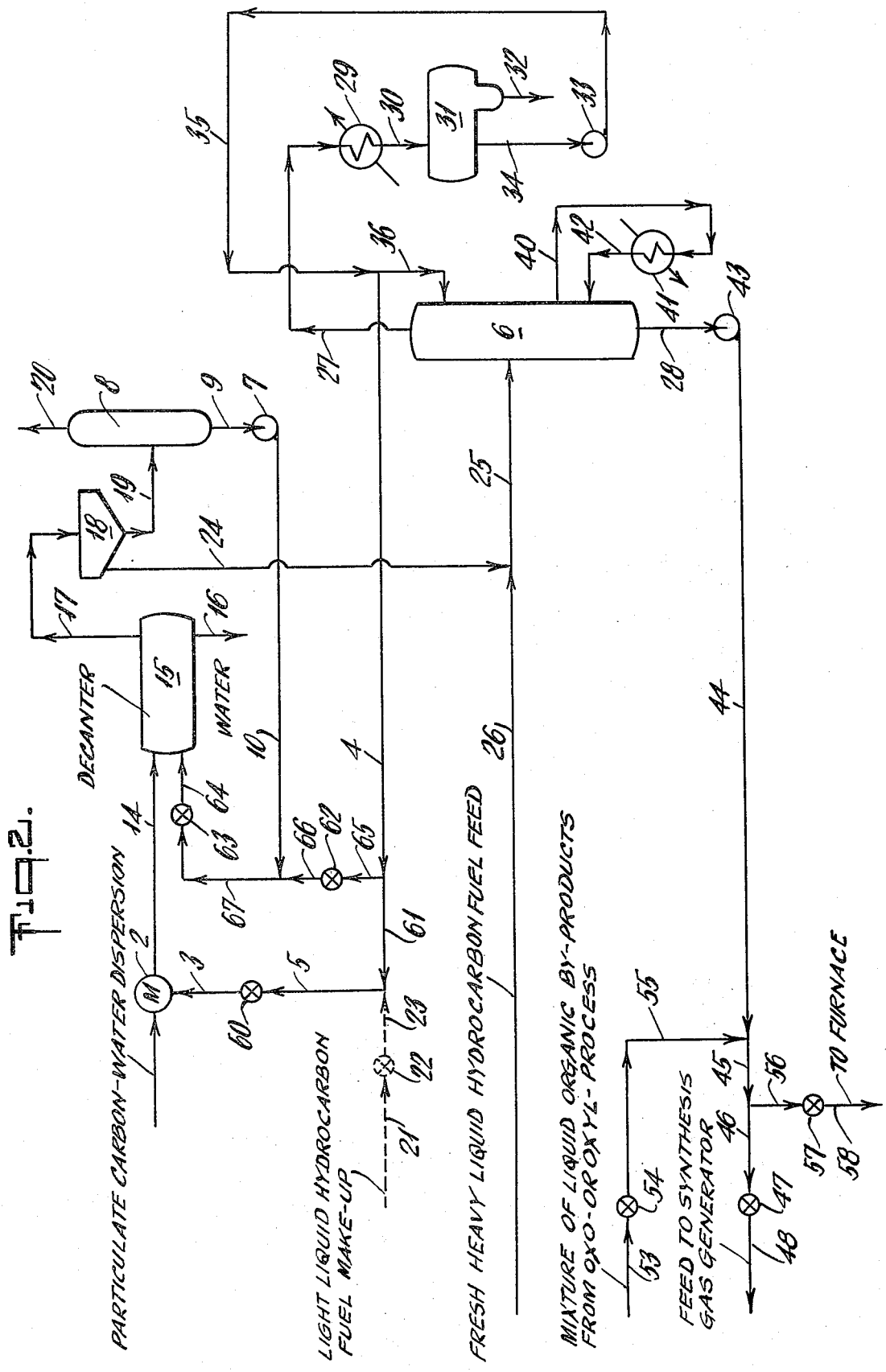

RECOVERY OF PARTICULATE CARBON FROM SYNTHESIS GAS

BACKGROUND OF THE INVENTION

Field of the Invention

This invention relates to a continuous process for recovering particulate carbon from synthesis gas, and particularly from carbon-water dispersions.

Description of the Prior Art

Raw synthesis gas leaving a partial oxidation synthesis gas generator comprises principally CO and $H_2$ together with minor amounts of finely divided carbon or particulate carbon. Preferably, the particulate carbon may be removed from the effluent gaseous stream by contacting the gas with water in a quenching and scrubbing zone. The finely divided carbon soot particles are wetted by water so as to form a mixture of particulate carbon and water. The particulate carbon produced in synthesis gas manufacture is unique and problems associated with the separation of synthesis gas carbon are not the same as those encountered in the removal of carbon or solids made by other processes. For example, the fine carbon particles from partial oxidation are unusual in that they will settle in water to only about 1.0 to 3.0 weight percent, whereas conventional carbon blacks may settle to concentrations of as much as 10 weight percent.

To produce synthesis gas economically, it is important to separate clear water from the carbon-water mixture for reuse. However, the fine particle size of the carbon soot makes ordinary filtration methods difficult and makes gravity separation uneconomical because of excess settling times i.e., about 1–2 days. Further, liquid hydrocarbon extraction procedures for recovering particulate carbon soot such as disclosed in coassigned U.S. Pat. No. 2,992,906 to F. E. Guptill, Jr. require large volumes of extractant. This in turn requires larger sized auxilliary process equipment. Further, under some conditions troublesome emulsions which are difficult to separate may form upon the addition of a gas to the oil carbon dispersion. By the process of our invention, particulate carbon is quickly and easily separated from quench and scrubbing water, so as to permit recycle of the clear water and recycle of the extractant.

The oxo process is the commercial application of a chemical reaction called oxonation or, more properly, hydroformylation. In this reaction, hydrogen and carbon monoxide are added across an olefinic bond to produce aldehydes containing one more carbon atom than the olefin.

The oxyl process is a method for directly producing alcohols by catalytically reducing carbon monoxide with hydrogen so as to link several partially reduced carbon atoms together. Essentially it is a modified Fischer-Tropsch Process which preferentially produces oxygenated compounds consisting mainly of alcohols.

SUMMARY

In one important aspect, the subject continuous process relates to a method for producing clean synthesis gas including the steps of:

1. reacting by partial oxidation a hydrocarbonaceous fuel with a free oxygen-containing gas in the reaction zone of a free-flow noncatalytic synthesis gas generator at a temperature in the range of about 1,300° to 3500°F and a pressure in the range of about 1 to 300 atmospheres in the presence of a temperature moderator to produce an effluent gas stream comprising principally $H_2$ and CO and containing entrained particulate carbon and at least one member of the group $CO_2$, $H_2O$, $H_2S$, COS, $CH_4$, A, and $N_2$;

2. introducing said effluent gas stream into gas-cooling and gas-scrubbing zones in which the gas stream is cooled and contacted with water so as to effect the removal of said particulate carbon from said effluent gas stream and producing a carbon-water dispersion;

3. removing gaseous impurities from the gas stream leaving (2) so as to produce a stream of synthesis gas substantially comprising $H_2$ and CO;

4. contacting said carbon-water dispersion with a liquid extractant comprising a light liquid hydrocarbon fraction produced in the distillation zone in (6) and a thin centrifuge stream of carbon-light liquid hydrocarbon fuel dispersion produced in (5), wherein the amount of said liquid extractant added to said carbon-water extractant is sufficient to render all of the carbon particles in said carbon-water dispersion hydrophobic and to resolve said carbon-water dispersion, and removing a stream of clarified water and a separate stream of carbon-light liquid hydrocarbon fuel dispersion in a separating zone;

5. introducing said carbon-light liquid hydrocarbon fuel from (4) into a centrifugal separating zone, withdrawing from said centrifugal separating zone a thick centrifuge stream of carbon-light liquid hydrocarbon fuel dispersion having a carbon content in the range of about 1 to 10 weight percent, and a comparatively thin centrifuge stream of carbon-light liquid hydrocarbon fuel dispersion having a carbon content in the range of about 0.02 to 1.0 weight percent; degasifying said thin stream and introducing said stream into said mixing zone in (4) as previously described as a portion of said liquid extractant, withdrawing said partially clarified water stream from said separating zone, and recycling said water to said gas-scrubbing zone in (2) to scrub carbon from the effluent gas stream from the gas generator, introducing said thick centrifuge stream of carbon-light liquid hydrocarbon fuel dispersion in admixture with fresh heavy liquid hydrocarbon fuel into a fractional distillation zone; and 6. removing a light liquid hydrocarbon fuel fraction from said distillation zone and recycling same to said mixing zone in (4) as a portion of said light liquid hydrocarbon fuel extractant; removing from said distillation zone a pumpable bottoms slurry comprising particulate carbon and the unvaporized portion of said heavy liquid hydrocarbon fuel and introducing same into said synthesis gas generator as at least a portion of said fuel.

The synthesis gas may be produced at the proper pressure and $H_2/CO$ mole ratio for direct feeding into an oxo or oxyl process. Advantageously, a mixture of liquid organic by-products produced in said oxo or oxyl process may be easily disposed of in the synthesis gas generator as a portion of the fuel.

DESCRIPTION OF THE INVENTION

Synthesis gas comprises principally $H_2$ and CO and may contain relatively small amounts of $CO_2$, $H_2O$, $CH_4$, $H_2S$, $N_2$, COS, A, particulate carbon and fuel ash. It may be made by the partial oxidation of a hydrocarbonaceous fuel in a free-flow synthesis gas generator. For example, a liquid hydrocarbon fuel such as fuel oil is reacted with a free-oxygen containing gas and steam at an autogenously maintained temperature within the range of about 1300° to 3500°F. and a pressure in the range of 1 to 300 atmospheres.

By scrubbing the effluent gas stream from the gas generator with water in a gas scrubbing zone, particulate carbon may be removed from the gas stream as a pumpable carbon-water dispersion containing about 0.5 to 3 weight percent carbon. This carbon-water dispersion is then treated with a liquid hydrocarbon fuel extractant to separate the carbon from the water. The extractant may comprise a light liquid hydrocarbon fuel fraction in admixture with a thin centrifuge stream of carbon-light liquid hydrocarbon fuel dispersion. The light liquid hydrocarbon fuel is described more fully later and may be selected from the group butanes, pentanes, hexanes, gasoline, kerosene, naphtha, light gas oils, and mixtures thereof.

The amount of light liquid hydrocarbon fuel extractant is sufficient to render all of the carbon particles in the carbon-water dispersion hydrophobic and to resolve the carbon-water dispersion. As further described below, the extractant may be added in one or two stages. The light liquid hydrocarbon extractant forms with the carbon from the carbon-water dispersion a pumpable carbon-light liquid hydrocarbon fuel dispersion containing about 0.5 to 5 wt. % carbon. A clarified water layer separates out in a decanter and falls to the bottom. The water layer is removed from the decanter and may be recycled to the scrubbing zone. The carbon-extractant dispersion which forms and floats on the water layer is removed and concentrated in a centrifugal separation zone.

The carbon-light liquid hydrocarbon fuel dispersion that is removed from the decanter is concentrated by means of centrifugal separation in a commercial centrifuge. Advantageously, by removing a portion of the liquid hydrocarbon fuel extractant in the overhead stream from the decanter by centrifugal separation, the size and heat duty of the extractant stripper used downstream in the process may be reduced. Simultaneously, a thin centrifuge stream of light liquid hydrocarbon fuel containing a minor amount of carbon is produced. This thin centrifuge stream is then recycled to the mixer or to the decanter, or both to resolve the carbon-water dispersion.

Industrial centrifuges such as described in Perry's Chemical Engineers' Handbook, by Perry, Chilton, and Kirkpatrick, Fourth Edition, McGraw Hill, Pages 19–86 to 19–100, employ centrifugal acceleration which is many times the gravitational acceleration. Centrifugal force causes sedimentation of solid particles through a layer of liquid or filtration of a liquid through a bed of porous solids. Centrifugal force, commonly expressed in multiples of the standard force of gravity, varies with the rotational speed and with the radial distance from the center of rotation.

Disc centrifuges for example illustrated in FIG. 19–139 of Perry's Chemical Engineers' Handbook develop 4,000 to 10,000 times the force of gravity. Disc centrifuges have bowl diameters in the range of about 7 to 32 inches, a disc spacing in the range of about 0.015 to 0.50 inches, a number of discs in the range of about 30 to 130, and a disc half angle in the range of about 35 to 50. Disc centrifuges and other conventional centrifuges are suitable for use in the subject process.

The heavy (thick) centrifuge stream in admixture with heavy liquid hydrocarbon fuel is introduced into a conventional fractional distillation zone. The ratio of heavy liquid hydrocarbon fuel to light liquid hydrocarbon fuel extractant in the thick centrifuge stream is in the range of about 0.02 to 40 lb per lb. A light liquid hydrocarbon fuel fraction having an atmospheric boiling point in the range of about 100° to 500°F. is removed from said distillation zone, cooled, liquefied, and recycled to said mixing zone as the extractant.

The total amount of light hydrocarbon fuel fraction from the distillation zone that is introduced into the decanter either in one or two-stage embodiments may be about 0.05 to 20 parts by weight of light liquid hydrocarbon fuel per part by weight of this centrifuge stream comprising carbon-light liquid hydrocarbon fuel dispersion. In two-stage decanter operation, preferably all of said thin centrifuge stream is introduced into the decanter in the second stage. However, a small portion i.e., up to 25 wt. % of the total amount of thin centrifuge stream may in addition be introduced into the mixing zone in the first stage in addition with said light hydrocarbon fuel fraction. However, the thin centrifuge stream may be introduced into the first stage only in another embodiment.

A pumpable liquid bottoms slurry containing the particulate carbon from said carbon-extractant dispersion from said distillation zone and the unvaporized portion of said heavy liquid hydrocarbon fuel is introduced into said synthesis gas generator as at least a portion of said fuel.

Heavy liquid hydrocarbon fuels suitable for use in this process include for example, heavy distillates, residual fuel oil, bunker fuel oil, No. 6 fuel oil, and mixtures thereof. The carbon content of said bottoms slurry in wt. % is in the range of about 0.5 to 25. Advantageously, a mixture of liquid organic by-products from an oxo or oxyl process in the amount of about 1 to 99 wt. % of the mixture so produced is mixed with said bottoms slurry. This mixture may be fed to the synthesis gas generator as feed. Alternatively, the mixture may be burned as fuel in a furnace. The clarified water from the separating zone is optionally purified and recycled to said gas-scrubbing zone to scrub the effluent gas stream from the gas generator.

Gaseous impurities in the effluent gas stream from the synthesis gas generator may be removed in a manner to be more fully described to produce synthesis gas e.g. mixtures of $H_2+CO$ having a mole ratio $H_2/CO$ in the range of about 0.9 to 2.0 moles of $H_2$ per mole of CO. Synthesis gas may be produced having a specific $H_2/CO$ mole ratio for introduction into said oxo or oxyl process.

In one embodiment of the invention, the mixtures of carbon monoxide and hydrogen produced in the synthesis gas generator are used as feed to the well known oxo or oxyl catalytic process. Liquid organic by-products from the oxo or oxyl process are then introduced into said synthesis gas generator as a portion of the fuel. Synthesis gas produced by the subject process with a $H_2/CO$ mole ratio in the range of about 1–2 moles of the $H_2$ per mole of CO are introduced into the Oxo process where carbon monoxide and hydrogen are added to an olefin in the presence of a cobalt catalyst at e.g. a temperature in the range of about 100° to 200°C and a pressure in the range of about 65 to 300 atmospheres to produce an aldehyde containing one carbon atom more than the original olefin. Thus, a hydrogen atom and formyl group may be added across the double bond of an olefin as shown in equations (1) and (2):

$$RCH = CH_2 + CO + H_2 \rightarrow RCH_2CH_2CHO \qquad (1)$$

$$RCH = CH_2 + CO + H_2 \rightarrow RCH(CHO)CH_3 \qquad (2)$$

Optionally, normal alcohols may be produced from the normal aldehydes by hydrogenation as shown in equation (3):

$$RCH_2CH_2CHO + H_2 \rightarrow RCH_2CH_2CH_2OH \qquad (3)$$

The oxo reaction is homogeneously catalyzed by carbonyls of group VIII metals, iron, cobalt, nickel, ruthenium, rhodium, palladium, osmium, irridium, and platinum. However, cobalt is the only metal whose carbonyl catalysts are of industrial importance e.g. $Co_2(CO)_8$, $HCo(CO)_4$, and $Co_4(CO)_{12}$.

Reaction times vary in the range, of about 5 to 60 minutes. The synthesis gas feed to the oxo or oxyl process contains 1–2 moles of hydrogen per mole of carbon monoxide.

Various olefinic raw materials include ethylene to produce propionaldehyde, propylene to produce butyraldehyde, and pentylenes, heptylenes, nonylenes, and dodecylenes used to produce higher oxo alcohols. Dimers and trimers of isobutylenes may be used. Straight chain products are favored over branched-chain products. For example, normal but not isobutyraldehyde can be converted into butanol or 2-ethyl-1-hexanol. Lower temperatures and higher carbon monoxide pressure favor the straight-chain isomer.

Processing steps required to produce an oxo product economically include (1) hydroformylation, or oxo reaction in an oxo reactor at a temperature in the range of about 100° – 200°C and a pressure in the range of about 65–500 atm; (2) removal of catalyst from the reaction mixture (decobalting); (3) cobalt catalyst recovery and processing for reuse; (4) aldehyde product refining; and optionally, (5) hydrogeneration at a temperature in the range of about 50°–250°C, and a pressure in the range of about 50–3500 psi to produce alcohols; and (6) alcohol refining. Oxo products, both aldehydes and alcohols are refined by conventional distillation equipment. Chemical treatment may be used to remove trace quantities of impurities.

The oxyl process as defined herein is a method for producing a mixture of oxygenenated organic compounds by catalytically reducing carbon monoxide with hydrogen at a temperature in the range of about 175° to 450°C and a pressure in the range of about 10 to 200 atmospheres. The $H_2/CO$ ratio may be in the range of about 0.9 to 2 moles of $H_2$ per mole of CO. Space velocities may range from 100 — 500 SCF of dry feed per cu. ft. of cat. per hr. and higher based on fresh feed. Both fused and precipitated iron catalysts may be used. The iron catalyst may contain copper, calcium oxide, diatomite, and may be impregnated with potassium hydroxide. Iron nitride catalysts may be used.

The oxyl process for producing alcohols may be illustrated by Equation (IV):

$$2n\ H_2 + nCO \rightarrow C_n H_{2n+1} OH + (n-1) H_2O \qquad (IV)$$

The alcohols may be subsequently converted to olefins and paraffins.

Essentially the oxyl process is a modified Fischer-Tropsch process which preferentially produces oxygenated compounds consisting mainly of alcohols. In addition to predominantly straight chain alcohols and few side chains, by-product esters, other oxygen-containing compounds, paraffins, and olefin hydrocarbons may be produced. The olefins may be treated by the oxo process (hydroformylation followed by hydrogenation) to increase the yield of alcohols.

For example a mixture of aliphatic oxygenated compounds containing approximately 30% alcohols in addition to acids, aldehydes, olefins, and esters may be produced by converting gaseous mixtures of $H_2 + CO$ over alkalized iron fillings at 150 atmospheres pressure and at a temperature of 400° – 450°C.

Another oxyl process operates at a pressure in the range of about 10 to 50 atmospheres and a temperature of about 175° – 230°C. Fused iron catalysts of the conventional ammonia-synthesis type and high space velocities are used. Gas recycle to increase the catalyst life may be employed: 7–20 volumes of recycle gas per volume of fresh synthesis gas. Straight chain alcohols e.g. up to $C_{12}$, may be produced by this process.

By-products as defined herein are normally liquid organic co-products formed in the hydroformylation or the oxyl process and consist of liquid organic materials from the group consisting of alcohols, aldehydes, esters, ketones, ethers, acids, olefins, saturated hydrocarbons, and mixtures thereof.

A particular advantage of the subject invention is that the stream synthesis gas may be produced in a synthesis gas generator at a proper pressure for use in the oxo or oxyl process. A costly gas compressor may thereby be eliminated. Also, the mixture of liquid organic by-products from the oxo or oxyl process, which may have previously presented a disposal problem may be now economically mixed with said carbon-heavy liquid hydrocarbon slurry bottoms from the distillation zone and burned in the gas generator as fuel to produce more synthesis gas. The specific composition of the mixture of liquid organic by-products from the oxo or oxyl process will depend upon the reaction conditions, the type of reactants, and the procedure used to refine the product. The amount of each constituent in the mixture may be taken from the ranges shown in Table I. This includes whole samples, fractions, and the raffinate after water extraction. If a group is present, there may be more than one compound in that group present in the extractant. If for example the mixture contains 65 wt. % of normal and isoalcohols and 5 wt. % of esters, than the total remaining constituents in the mixture cannot exceed 30 wt. %. The term "by-products" includes by definition the liquid organic waste products from the oxo or oxyl process which have the composition shown in Tables I and II.

TABLE I

INGREDIENTS IN LIQUID ORGANIC BY-PRODUCTS of Oxo or Oxyl Process

| Group | Carbon Range | Wt. % |
|---|---|---|
| Alcohols | $C_3$ to $C_{16}$ | 2 to 75 |
| Esters | $C_6$ to $C_{28}$ | 5 to 70 |
| Aldehydes | $C_3$ to $C_{16}$ | Nil to 25 |
| Ketones | $C_3$ to $C_{16}$ | Nil to 25 |
| Ethers | $C_6$ to $C_{28}$ | Nil to 50 |
| Acids | $C_3$ to $C_{16}$ | Nil to 10 |
| Olefins | $C_5$ to $C_{15}$ | Nil to 30 |
| Saturated Hydrocarbons | $C_5$ to $C_{28}$ | Nil to 50 |
| Water | | Nil to 15 |

The ultimate analysis of the liquid organic by-products of the oxo or oxyl process is shown in Table II.

The elements may be taken from the ranges shown so long as the total wt. % is 100.

TABLE II

ULTIMATE ANALYSIS OF LIQUID ORGANIC BY PRODUCTS of Oxo or Oxyl Process

| | Wt. % |
|---|---|
| Carbon | About 55 to 90 |
| Hydrogen | About 5 to 17 |
| Oxygen | About 3 to 40 |

The preferred maximum concentration of organic acid present in the mixture is less than 5 wt %, for example 1–2 wt. %. The organic esters are the reaction products of primary saturated alcohols and low molecular weight saturated organic acids.

The composition of a typical liquid organic mixture, as produced for example by the process shown in Hydrocarbon Processing, Page 211, November 1969, Gulf Publishing Co., Houston, Texas and comprising the liquid organic by-products of an oxo process is shown in Table III.

TABLE III

COMPOSITION OF TYPICAL MIXTURE
Comprising Liquid Organic By-Products From Oxo Process

| | Wt. % |
|---|---|
| Esters | 56 |
| Ethers | 20 |
| Aldehydes | 5 |
| Ketones | 5 |
| Acids | 5 and below |
| Saturated hydrocarbons | 1 and below |
| Olefins | 1 and below |
| Alcohol | 5 |
| Water | 2 |

The esters in the aforesaid mixture have an average $C_{12}$ number and are formed by the reaction of $C_4$ to $C_9$ alcohols and $C_3$ to $C_8$ acids. The esters are highly branched and have an average $C_{12}$ number. The alcohols include normal and isobutanol and isopropyl alcohol. The ultimate analysis of said typical mixture is shown in Table IV.

TABLE IV

ULTIMATE ANALYSIS OF TYPICAL MIXTURE
Comprising Liquid Organic By-Products From Oxo Process

| | Wt. % |
|---|---|
| Carbon | 69.2 |
| Hydrogen | 12.0 |
| Oxygen | 18.8 |

Other properties of said typical mixture are shown in Table V.

TABLE V

Properties of Typical Mixture
Comprising Liquid Organic By-Products From Oxo Process

| | | | |
|---|---|---|---|
| Gravity | | API | 29.2 |
| Density, | | | 0.87 |
| Viscosity, | | Centistokes | |
| | 68°F | | 4.1 |
| | 122°F | | 2.0 |
| Distillation, | | ASTM | |
| | Vol. % | | °F |
| | IBP | | 290 |
| | 10 | | 326 |
| | 20 | | 344 |

TABLE V-continued

Properties of Typical Mixture
Comprising Liquid Organic By-Products From Oxo Process

| | | | |
|---|---|---|---|
| Gravity | | API | 29.2 |
| Density, | | | 0.87 |
| Viscosity, | | Centistokes | |
| | 68°F | | 4.1 |
| | 122°F | | 2.0 |
| Distillation, | | ASTM | |
| | Vol. % | | °F |
| | 30 | | 360 |
| | 40 | | 376 |
| | 50 | | 396 |
| | 60 | | 422 |
| | 70 | | 450 |
| | 80 | | 484 |
| | 90 | | 526 |
| | 95 | | 532 |
| | EP | | 564 |

The synthesis gas generator in my process preferably consists of a compact, unpacked, free-flow noncatalytic, refractory lined steel pressure vessel of the type described in coassigned U.S. Pat. No. 2,809,104 issued to D. M. Strasser et al, which patent is incorporated herewith by reference.

The free-oxygen containing gas may be selected from the group consisting of air, oxygen-enriched air (22 mole percent $O_2$ and higher), and preferably substantially pure oxygen (95 mole percent $O_2$ and higher).

Preheating of the reactants is optional but generally desirable. For example, a hydrocarbon oil and steam may be preheated to a temperature in the range of about 100° to 700°F. and the oxygen may be preheated to a temperature in the range of about 100° to 750°F.

A wide variety of hydrocarbonaceous fuels are suitable as feed stocks for the partial oxidation process, either alone, in combination with each other, or suitably in combination with said carbon-heavy liquid hydrocarbon fuel slurry from the distillation zone. Preferably, from about .01 to 99 parts by weight of fresh mixture of liquid organic by-products from an oxo or oxyl process may be mixed with each part by weight of the bottoms product from the fractional distillation zone, to be further described.

The hydrocarbonaceous fuels include heavy and light liquid hydrocarbon fuels. Included are petroleum distillates and residue, gas oil, residual fuel, reduced crude, fuel oil, whole crude, coal tar oil, shale oil, tar sand oil, and mixtures thereof.

Pumpable slurries of solid carbonaceous feedstocks i.e., lignite, bituminous and anthracite coals in water or in said liquid hydrocarbon fuels are included herewith as within the scope of the definition for hydrocarbonaceous fuels which may be fed to the gas generator. Similarly, pumpable slurries of particulate carbon soot in a carrier from the group consisting of liquid hydrocarbon fuel or residues thereof, liquid organic by-products from an oxo or oxyl process or residues thereof, and mixtures thereof are also by definition hydrocarbonaceous fuels which may be fed to the gas generator.

Light liquid hydrocarbon fuel extractant as used herein have the following characteristics: atmospheric boiling point in the range of about 100° to 500°F., degress API in the range of over 20 to about 100 and a carbon number in the range of about 5 to 16.

Heavy liquid hydrocarbon fuels as used herein have a gravity in degrees API in the range of about −20 to 20.

It is normal to produce from hydrocarbonaceous fuels by partial oxidation about 0.5 to 20 weight percent of free carbon soot (basic carbon in the hydrocarbonaceous fuel). The free carbon soot is produced in the reaction zone of the gas generator for example, by cracking hydrocarbonaceous fuels. Carbon soot will prevent damage to the refractory lining in the generator by constituents which are present as ash components in residual oils. With heavy crude or fuel oils it is preferable to leave about 2 to 3 weight percent of the carbon in the feed as free carbon soot in the product gas. With lighter distillate oils, progressively lower carbon soot yields are taken.

The amount of soot in the product synthesis gas may be controlled primarily by regulating the oxygen to carbon ratio (O/C atom/atom) in the range of 0.7 to 1.5 atoms of oxygen per atom of carbon in the fuel and to some extent by regulating the weight ratio of $H_2O$ to hydrocarbon fuel in the range of 0.15 to 3.0 pounds of $H_2O$ per pound of fuel. In the above relationship, the O/C ratio is to be based upon (1) the total of free-oxygen atoms in the oxidant stream plus combined oxygen atoms in the hydrocarbonaceous fuel feed molecules and (2) the total of carbon atoms in the hydrocarbonaceous fuel feed plus carbon atoms in recycled particulate carbon (slot). Since the oxo and oxyl by-products contain combined oxygen atoms, the requirement of free-oxygen for gasification is less than for ordinay hydrocarbons. In fact, there is a synergistic effect leading to even lower oxygen consumption then would be expected according to direct proportionality. $H_2O$ is principally introduced into the reaction zone to help control the reaction temperature, to act as a dispersant of the hydrocarbon fuel fed to the reaction zone, and to serve as a reactant to increase the relative amount of hydrogen produced. Other temperature moderators include $CO_2$-rich gas, a cooled portion of product gas, cooled off-gas from an integrated ore-reduction zone, nitrogen, and mixtures thereof.

Many advantages are achieved in the subject process by the addition of oxygen containing hydrocarbon material, such as found in the liquid organic by-product of the oxo or oxyl process, as a portion of the feed to the synthesis gas generator. For example, for a given level of soot production, the amount of free-oxygen supplied to the reaction zone of the synthesis gas generator, and the steam to fuel weight ratio may be decreased at a substantial cost savings.

The free carbon soot leaving the reaction zone entrained in the stream of product synthesis gas has some unique properties. It is both hydrophilic and oleophilic. It is easily dispersed in water and has a high surface area. For example, the specific surface area of the free carbon soot, as determined by nitrogen absorption, ranges from 100 to 1,200 square meters per gram. The Oil Absorption Number, which is a measurement of the amount of linseed oil required to wet a given weight of carbon soot, ranges from 1.5 to 5 cc's of oil per gram of carbon soot. For further information regarding the test method of determining the Oil Absorption Number See ASTM Method D-281.

Free carbon soot, also referred to herein as particulate carbon, as produced within our process has a particle size in the range of about 0.01 to 0.5 microns and commonly has a particle diameter of about 77 millimicrons. Free carbon soot comprises about 92 to 94 weight percent of carbon, 0.1 to 4 weight percent of sulfur, and 3 to 5 weight percent of ash. Being formed at high temperatures, it is substantially free from volatile matter.

In one embodiment of our invention, the hot gaseous effluent from the reaction zone of the synthesis gas generator may be quickly cooled below the reaction temperature to a temperature in the range of 180° to 700°F by direct quenching in water in a gas-liquid contacting or quenching zone. For example, the cooling water may be contained in a carbon-steel quench vessel or chamber located immediately downstream from the reaction zone of said gas generator. A large diameter dip leg starting at the bottom end of the reaction zone and discharging beneath the water level in the quench chamber serves as an interconnecting passage between the reaction zone and the quench zone through which the hot product gases pass. This passage also serves substantially to equalize the pressure in the two zones. A concentric draft tube, open on both ends, may surround said dip leg, and create an annulus through which mixture of quenched gas and water rises vigorously and splashes against the support plate of the reactor floor. The water and gas then separate in the quench chamber in the space outside the draft tube. The circulation of water through the draft tube system maintains the entire quench system at essentially the temperature of the water leaving the quench vessel, which is also the temperature of the saturated steam in the quench zone.

Recycle water from the carbon scrubbing zone, to be further described is normally introduced through a quench ring at the top of the dip-leg to cool the metal at that point. Large quantities of steam are generated in the quench vessel, and the quench chamber may be likened to a high output high pressure boiler.

The turbulent condition in the quench chamber, caused by the large volume of gases bubbling up through said annular space, helps the water to scrub a large part of the solids from the effluent gas so as to form a dispersion of unconverted particulate carbon and quench water. Further, steam required for any subsequent shift conversion step is picked up by the effluent synthesis gas during quenching. For a detailed description of the quench chamber, reference is made to coassigned U.S. Pat. No. 2,896,927 issued to R. E. Nagle et al., which is herewith incorporated by reference. Any residual solids in the cooled and scrubbed effluent synthesis gas leaving the quench chamber may be removed by means of a conventional venturi or jet scrubber, such as described in Perry's Chemical Engineer's Handbook, Fourth Edition, McGraw-Hill Co., 1963, pages 18-55 to 56.

Alternately, the hot effluent gas stream from the reaction zone of the synthesis gas generator may be cooled to a temperature in the range of about 240 to about 700 F. by indirect heat exchange in a waste heat boiler. The entrained solid particles may be then scrubbed from the effluent synthesis gas by contacting and further cooling the effluent stream of synthesis gas with quench water in a gas-liquid contact apparatus, for example, a quench dip-leg assembly, a spray tower, venturi, or jet scrubber, bubble plate contactor, packed column, or in a combination of said equipment. For a detailed description of cooling synthesis gas by means of a waste heat boiler, and a scrubbing tower, reference is made to coassigned U.S. Pat. No. 2,999,741 issued to R. M. Dille et al and incorporated herewith by reference.

It is desirable to maintain the concentration of particulate carbon in the gas cooling and scrubbing water streams in the range of about 0.5 – 3 wt. % and preferably below about 1.5 wt. %. In this manner, the dispersion of carbon in water will be maintained sufficiently fluid for easy pumping through pipelines and for further processing.

The temperature in the scrubbing zone is in the range of about 180° to 700°F., and preferably in the range about 250° – 550°F. The pressure in the scrubbing zone is in the range of about 1–250 atmospheres, and preferably at least 25 atmospheres. Suitably the pressure in the scrubbing zone is about the same as that in the gas generator, less ordinary pressure drop in the line.

It is important with respect to the economics of the process that the particulate carbon be removed from the carbon-water dispersion and the resulting clear water to be recycled and reused for cooling and scrubbing additional particulate carbon from the synthesis gas. In the single stage embodiment of the subject process all of the previously described light liquid hydrocarbon fuel extractant in admixture with all of said thin centrifuge stream may be mixed with the carbon-water dispersion at one time. The carbon water dispersion is thereby resolved and the carbon is separated from the water. In this embodiment the amount by weight of said mixture of light liquid hydrocarbon fuel and thin centrifuge steam that is mixed with said carbon-water dispersion in a mixing zone is in the range of about 10 to 200 times, and preferably in the range of about 20–100 times the weight of the particulate carbon in the carbon-water dispersion. This amount is sufficient to render all of said particulate carbon hydrophobic and to resolve the carbon-water dispersion. Clarified water separates from the particulate carbon and a carbon-extractant dispersion is produced.

The carbon-water dispersion may be contacted with said light liquid hydrocarbon fuel extractant by any means e.g. mixing valve, static mixer, baffled mixer, pump, orifice, nozzle, propeller mixer, or turbine mixer. High pressure will make possible the use of an extractant having a lower boiling point. High temperature facilitates phase separation.

The mixed stream is passed into a phase separating zone, for example a decanter or tank providing a relatively quiescent settling zone. In the separating zone, also known as a decanter, clarified water sinks to the bottom by gravity. A dispersion of carbon in said light liquid hydrocarbon fuel extractant may float on top of the clarified water. The volume of the settling tank should be sufficient to provide a suitable residence time preferably of at least two minutes, and usually in the range of about 5 to 15 minutes.

The pressure in the settling zone or decanter should be sufficient to maintain both the extractant and the water in liquid phase, e.g. 1 to 200 atmospheres, depending upon temperature. The temperature, in the decanter will be at or below that of the carbon-water dispersion leaving the scrubbing zone e.g. ambient -700°F., and preferably in the range of about 200°–550°F.

Clarified water is removed from the decanter, and at least a portion in admixture with fresh water may be recycled to the scrubbing zone. Optionally, at least a portion of the dissolved water soluble constituents from the extractant may be removed from the clarified water by conventional means before the water is recycled to the scrubbing zone.

For example, the clarified water stream may be introduced into a gas-liquid separation zone where the pressure is suddenly dropped. A light gaseous fraction is flashed off which is cooled below the dew point to separate uncondensed light gases, water, and water soluble liquid hydrocarbon compounds. Clarified water is removed from the separation zone and recycled to the scrubbing zone.

As previously mentioned, another embodiment of the invention involves two simultaneous additions of extractant in two stages. Thus in the first stage, the aforesaid carbon-water dispersion is resolved into a clarified water layer and a dry carbon powder which floats on the clarified water. This may be accomplished by adding the liquid hydrocarbon extractant to the carbon-water dispersion in an amount just sufficient to render all of the carbon hydrophobic but insufficient to produce a carbon-extractant dispersion at this stage. As a result of this smaller amount of extractant, the carbon separates rapidly and substantially completely from the water and floats to the surface of the clarified water layer as a dry — appearing unagglomerated soot.

The liquid hydrocarbon extractant introduced into the mixing zone in the first stage comprises a portion of said light liquid hydrocarbon fuel fraction obtained subsequently in the distillation zone. However, the light liquid hydrocarbon fuel may be mixed with 0 to 25 weight % of the thin centrifuge stream. Further, optionally light liquid hydrocarbon fuel make-up from an external source may be introduced into the mixing zone at this time.

The amount of liquid hydrocarbon extractant to be added may be obtained experimentally by shake tests. Small increments of extractant are added to the carbon-water dispersion until the carbon separates rapidly and floats on the surface of the clarified water. Thus when the water phase is clear and the carbon is "dry" and fluffy, the amount of extractant is optimum. The amount of extractant added in the first stage is about 1 to 3 times the Oil Absorption No. of the particulate carbon in the carbon-water dispersion. This may range between about 1.5 –10 lbs. of extractant per lb. of carbon or more likely in the range of about 1.5 to below 5.

In the second stage, the particulate carbon is floated off the surface of the clarified water layer by introducing a horizontal stream of liquid extractant comprising at least a portion of said thin centrifuge stream in admixture with a portion of said light liquid hydrocarbon fuel fraction from the distillation zone into said decanter at the interface between said clarified water layer and said particulate carbon. The sweeping action across the interface will also disperse the carbon in the light liquid hydrocarbon fuel fraction.

The principal advantage of the two-stage addition of the liquid extractant lies in the avoidance of the formation of emulsions. In the first stage, the carbonwater dispersion is resolved and the carbon floats to the surface of the water with the addition of a minimum of liquid extractant. In the second stage the secondary extractant is added in much larger amount with a minimum of mixing with the water so that emulsion formation is avoided even if emulsifying agents are present.

The amount of liquid extractant that is introduced into the second stage is sufficient to form a carbon-light liquid hydrocarbon fuel dispersion containing about 0.5–5 wt % carbon. This amount may be about ten times the amount of extractant that was used in the first stage. The clarified water is removed from the decanter in the manner described previously.

As previously mentioned, the carbon-extractant dispersion removed overhead from the decanter may be concentrated by centrifugal separation and divided into a thick stream of carbon-light liquid hydrocarbon fuel dispersion and a comparatively thin stream of carbon-light liquid hydrocarbon fuel dispersion. The thick stream may have a carbon content in the range of about 1 to 10 wt. % and suitably about 4 to 7 wt. %. The thin stream has a carbon content in the range of about $0.0_2$ to 1.0 wt. %, and suitably about 0.1 to 0.5 wt. %. The thick stream of carbon-extractant is then passed into the distillation column in admixture with fresh heavy liquid hydrocarbon fuel as previously described. This pumpable mixture may comprise about 0.02 to 40 and preferably 0.1 to 10 lbs of fresh heavy liquid hydrocarbon fuel per lb of light liquid hydrocarbon fuel in the thick centrifuge stream.

Prior to recycle to the mixing and separating zone, the comparatively clean centrifuge stream of carbonextractant may be passed into a gas-liquid separator where any waste gas is removed.

The temperature and pressure in the decanter and centrifugal separation zone are preferably substantially the same.

The light hydrocarbon fuel fraction is removed from the conventional fractional distillation column or stripping tower, cooled, liquefied, and recycled to said mixing zone, decanter, or both as said light liquid hydrocarbon fuel fraction extractant, as previously described.

The distillation or stripping tower is operated under suitable conditions for removing the carbon from said thick centrifuge stream by producing said substantially carbon-free liquid hydrocarbon fuel fraction extractant, and also a pumpable residue slurry comprising said particulate carbon and the unvaporized portion of said heavy liquid hydrocarbon fuel. This residue slurry contains about 0.5 to 25 wt. % carbon and is removed from the bottom of the distillation column. It may be passed in indirect heat exchange with incoming feed, and then introduced into said partial oxidation synthesis gas generator as at least a portion of the feed. Fuel mixtures comprising about 1 to 99 wt. %, and preferably about 5 to 50 wt. % of said mixture of liquid organic by-products from the oxo or oxyl process and the remainder said bottoms slurry from the distillation column are preferably introduced into the synthetic gas generator as feed. Alternately, said fuel mixture may be burned in a furnace, for example to produce steam. A suitable pressure in the distillation tower may be in the range of about 14.7 to 100 psig. Normally, conditions of temperature and pressure in said distillation column are such that substantially no fractionation of the fresh heavy liquid hydrocarbon fuel takes place.

Although the process of the invention is particularly suitable for removing substantially all of the dispersed particulate carbon from a carbon-water dispersion produced by water scrubbing the effluent gaseous stream from the partial oxidation process, it may be similarly used in many other hydrocarbon gasification processes.

DESCRIPTION OF THE DRAWING AND EXAMPLES

A more complete understanding of the invention may be had by reference to the accompanying schematic drawing which shows in FIG. I the previously described process in detail. Quantities have been assigned to the various streams on an hourly basis so that the following description in Example I may also serve as an example of the subject invention.

EXAMPLE I

In this embodiment of the continuous process, the decanter is operated in a single stage. Referring to FIG. I of the drawing, on an hourly basis about 14,400 lbs. of a particulate carbon-water dispersion at a temperature of about 250°F and containing about 144 lbs. of particulate carbon from the gas scrubbing zone of a process for making synthesis gas by the partial oxidation of a hydrocarbonaceous fuel to be further described are passed through line 1 into mixer valve 2 in which said carbon-water dispersion is mixed with about 10,727 lbs. of a light liquid hydrocarbon fuel extractant from line 3. The liquid extractant in line 3 comprises 2,880 lbs. of light hydrocarbon fuel fraction from lines 4 and 5, which is produced subsequently in the process in fractional distillation column 6, to be further described, in admixture with 7,847 lbs. of a thin centrifuge stream which is pumped by pump 7 from holding tank 8 through lines 9 and 10. In the subject example the light liquid hydrocarbon fuel is naphtha per ASTM D288. The thin centrifuge stream comprises a carbon dispersion of said light liquid hydrocarbon fuel extractant containing particulate carbon, to be further described.

The mixture of light liquid hydrocarbon fuel extractant and carbon-water is passed through line 14 into decanter 15. A relatively quiescent volume is provided in the settling zone at a pressure of about 25 atmospheres. Substantially clear water, containing substantially no dissolved water soluble constituents from said light liquid hydrocarbon fuel fraction extractant, settles by gravity to the bottom of decanter 15 and is removed by way of line 16. If necessary, the water in line 16 may be purified by conventional means and then recycled to the gas cooling and scrubbing zone. A portion may be discharged from the system and replaced with fresh water. 10,727 lbs. of said light liquid hydrocarbon fuel extractant in a dispersion of not less than 144 lbs. of particulate carbon together with any entrained water are removed near the top of decanter 15 by way of line 17 and are introduced into a disc-type centrifugal separator 18. The centrifuging speed corresponds to about 9500 revolutions per minute.

About 7,847 lbs. of a thin centrifuge stream of said light liquid hydrocargon fuel extractant containing particulate carbon is removed from centrifuge 18 by way of line 19 and is introduced into holding tank 8. Waste gas is discharged to a flare through line 20. Optionally, light liquid hydrocarbon fuel make-up from an external source may be fed into the system through line 21 valve 22 and line 23.

About 3024 lbs. of a thick centrifuge stream of particulate carbon-extractant is removed from centrifuge 18 by way of line 24 containing about 144 lbs. of particulate carbon. Thick centrifuge stream is mixed in line 25 with about 8,172 lbs. of a fresh heavy liquid hydrocarbon fuel feed from line 26. The heavy hydrocarbon fuel is a heavy fuel oil having the following characteristics: °API 19.6, Gross Heating Value 17,814 BTU per lb., and Ultimate Analysis, Wt. % C 81.2, H, 11.4, N 0.5, S 3.3, O 3.5 and Ash 0.2. The mixture in line 25 is introduced into fractional distillation tower 6.

The operating conditions of distillation column 6 in this example are such that substantially none of the heavy liquid hydrocarbon fuel in the mixture from line 25 is removed as a portion of the light hydrocarbon fraction leaving the column by way of line 27. In other words substantially all of said heavy liquid hydrocarbon fuel feed passes out of the bottom of column through line 28 as a pumpable carbon slurry containing 144 lbs. of particulate carbon. The pressure in the distillation column is about 15 psia.

The light liquid hydrocarbon fuel extractant in the thick centrifuge stream charged to distillation column 6 is vaporized, and 3,606 lbs are passed overhead as a carbon-free stream through line 27. This stream is then cooled and condensed in heat exchanger 29. The stream is passed through line 30 into liquid-liquid separator 31. Any water is drawn off through line 32. The light liquid hydrocarbon fuel extractant is pumped by means of pump 33 through line 34 and into line 35. About 2,880 lbs. of the light liquid hydrocarbon fuel extractant is passed through lines 35, 4, 5, and 3 into mixing zone 2 as previously described as a portion of said single stage liquid extractant. The remainder of the liquid stream from line 35 i.e., 726 lbs. is recycled through line 36 into fractionation column 6. The recycle ratio for distillation column 6 may range from 0.05 to 0.5 lbs. of reflux in line 36 per lb. of extractant in the column feed in line 25.

A slip stream is removed from column 6 by way of line 40 and passed through reboiler 41 where the temperature is raised to the desired temperature for vaporizing the overhead fraction and recycled to column 6 through line 42.

The bottoms carbon-oil slurry in line 28 comprising 8,172 lbs. of heavy liquid hydrocarbon fuel oil and 144 lbs. of particulate carbon are pumped by means of pump 43 into the reaction zone of a synthesis gas generator (not shown) as a portion of the fuel. Thus the bottoms slurry may be pumped through line 44–46, valve 47, and line 48 into a synthesis gas generator (not shown).

Advantageously, a portion of the fresh mixture of liquid organic by-products from an oxo or oxyl process in line 53, to be further described, is passed through valve 54, line 55 and into line 45 where it is mixed with said carbon-oil slurry from line 44. This improved liquid fuel mixture is then passed through lines 46 and 48 into said synthesis gas generator as at least a portion of the feed. Optionally, a portion of the mixture of fluids in line 45 may be introduced into a furnace (not shown) as fuel, by way of line 56, valve 57, and line 58.

Thus, in the subject process about 1,794 lbs. of liquid organic by-products from an oxo-process for the production of n-butyraldehyde from line 53 are mixed in line 45 with 8,316 lbs. of carbon-heavy fuel oil slurry from line 44. This mixture is then introduced into the synthesis gas generator as said hydrocarbonaceous fuel and reacted with 10,183 lbs. of oxygen (99.5 mole % $O_2$) and 4,395 lbs. of steam.

About 497,000 standard cubic feet (dry basis) of synthesis gas is produced in a noncatalytic free-flow gas generator at a temperature of about 2400°F. and a pressure of about 37 atmospheres by the partial oxidation of said hyddrocarbonaceous fuel feedstock. The composition of the synthesis gas in mole % follows: CO 41.00, $H_2$ 42.22, $CO_2$ 4.39, $H_2O$ 11.26, $CH_4$ 0.21, A 0.11, $N_2$ 0.12, $H_2S$ 0.66, and COS 0.03. After purification, as previously described, the mixture of $H_2$ and CO is compressed and introduced into said oxo process for the production of n-butyraldehyde.

EXAMPLE II

In this embodiment of the invention, the decanter is operated in two-stages to improve performance. Aside from this, the rest of the continuous process is substantially the same as that described previously in Example I.

With reference to FIG. 2 of the drawing, on an hourly basis in the first stage of the extraction operation with valve 60 open about 432 lbs. of light liquid hydrocarbon fuel extractant from lines 35, 4, 61, 5, and 3 are introduced into mixer 2 along with 14,400 lbs. of carbon-water dispersion containing 144 lbs. of particulate carbon from line 1. This amount of liquid extractant is sufficient to render the particulate carbon hydrophobic and to release substantially dry powdered carbon.

In the second stage of the decanter operation with valves 62 and 63 open, simultaneously about 10,295 lbs. of extractant in a carbon-extractant dispersion are introduced to float off the carbon particles and to form the carbon-light liquid hydrocarbon fuel dispersion in line 17. The carbon-extractant in line 64 comprises light liquid hydrocarbon fraction from distillation column 6 by way of lines 35, 4, 65-67, and valve 63; and thin centrifuge steam from line 9, pump 7, lines 10, 67, and valve 63.

Obviously, various modifications of the invention as herein before set forth may be made without departing from the spirit and scope thereof and therefore, only such limitations should be made as are indicated in the appended claims.

I claim:

1. In a process for continuously producing clean gaseous mixtures comprising $H_2$ and CO by the partial oxidation of a hydrocarbonaceous fuel or slurry of carbonaceous fuel with a free oxygen-containing gas in the reaction zone of a free-flow noncatalytic gas generator at a temperature in the range of about 1300° to 3500°F and a pressure in the range of about 1 to 300 atmospheres in the presence of a temperature moderator to produce an effluent gas stream comprising $H_2$ and CO and containing entrained particulate carbon and at least one member of the group $CO_2$, $H_2O$, $H_2S$, COS, $CH_4$, $N_2$, and A; and introducing said effluent gas stream into gas-cooling and gas-scrubbing zones in which the gas stream is cooled and contacted with water, effecting the removal of said particulate carbon from said effluent gas stream and producing a carbon-water dispersion; the improved method of separating said particulate carbon from said carbon-water dispersion which comprises: (1) contacting said carbon-water dispersion with liquid organic extractant comprising light liquid hydrocarbon fuel fraction having a gravity in degrees API in the range of over 20 to about 100 and a carbon number in the range of about 5 to 16 and produced in the distillation zone in step (3) and a thin centrifuge stream of carbon-light liquid hydrocarbon fuel dispersion produced in step (2), after removal of any waste gas; wherein the amount of said liquid organic extractant introduced is sufficient to render all of the carbon particles in said carbon-water dispersion hydrophobic and to resolve said carbon-water dispersion; and by decanting removing a stream of clarified water and a separate stream of pumpable carbon-light hydrocarbon fuel dispersion having a carbon content of about 0.5 to 5 weight % in a separating zone at a temperature in the range of about ambient to 700°F and a sufficient pressure to maintain said liquid organic extractant and said clarified water in liquid phase; (2) introducing said carbon-light liquid hydrocarbon fuel dispersion from (1) into a centrifuging zone at a temperature in the range of about ambient to 700°F and a pressure in the range of about 1 to 200 atmospheres, separately withdrawing from said centrifuging zone a thick stream of carbon-light liquid hydrocarbon fuel dispersion having a carbon content in the range of about 1 to 10 weight percent, and a comparatively thin stream of carbon-light liquid hydrocarbon fuel dispersion having a carbon content in the range of about 0.02 to 1.0 weight percent; degasifying said thin stream and introducing said stream into (1), as previously described as a portion of said liquid organic extractant, withdrawing said clarified water stream from said separating zone, and recycling said water to said gas-scrubbing zone to scrub carbon from the effluent gas stream from the gas generator, introducing said thick stream of carbon-light liquid hydrocarbon fuel dispersion in admixture with fresh heavy liquid hydrocarbon fuel having a gravity in degrees API in the range of about −20 to 20 and in the amount of about 0.02 to 40 lbs. of fresh heavy liquid hydrocarbon fuel per lb. of light liquid hydrocarbon fuel in said thick centrifuge stream into a fractional distillation zone; and (3) removing a light liquid hydrocarbon fuel fraction from said distillation zone and recycling same to (1) as a portion of said light liquid hydrocarbon fuel extractant; removing from said distillation zone a pumpable bottoms slurry comprising particulate carbon and the unvaporized portion of said heavy liquid hydrocarbon fuel and introducing same into said gas generator as at least a portion of said fuel.

2. The process of claim 1 wherein all of said liquid organic extractant is introduced in step (1) in a single stage and comprises about 0.05 to 20 parts by weight of said light liquid hydrocarbon fraction in admixture with each part by weight of a thin centrifuge stream of carbon-light liquid hydrocarbon fuel dispersion.

3. The process of claim 1 where in step (1), said liquid organic extractant in an amount of about 10 to 200 times the weight of the particulate carbon in the carbon-water dispersion is mixed with said carbon-water dispersion.

4. The process of claim 1 wherein the addition of said liquid organic extractant in step (1) is effected in two stages including in the first stage the step of mixing said carbon-water dispersion with about 1.5-10 lbs. of liquid organic extractant per lb. of carbon so as to render all of said particulate carbon hydrophobic and to release dry powdered carbon from said carbon-water dispersion, with said carbon floating on the surface of a clarified layer of water in said separating zone; and in the second stage introducing a stream of liquid organic extractant into said separating zone adjacent the water surface to float off said carbon from the surface of the bottom layer of said clarified water while forming said carbon-extractant dispersion containing about 0.5 to 5 weight percent carbon.

5. The process of claim 4 wherein the amount of said liquid organic extractant mixed with the carbon-water dispersion in the first stage on a weight basis is about 1 to 3 times the Oil Absorption Number of the particulate carbon as determined by ASTM D281-31.

6. The process of claim 4 wherein the liquid organic extractant in said first stage comprises light liquid hydrocarbon fraction from said distillation zone. in admixture with 0 to 25 weight percent of said thin centrifuge stream, and wherein the total amount of light hydrocarbon fuel fraction is about 0.05 to 20 parts by weight of light liquid hydrocarbon fuel per part by weight of thin centrifuge stream.

7. The process of claim 1 provided with the additional step of mixing a portion of a fresh mixture of liquid organic by-products from the oxo or oxyl process comprising at least one alcohol and at least one ester in admixture with at least one member of the group consisting of aldehydes, ketones, ethers, acids, olefins, saturated hydrocarbons and water, with the pumpable bottoms slurry leaving step, (3), to produce said gas generator feedstock or a furnace fuel or both.

8. The process of claim 1 provided with the additional steps of expanding and dropping the pressure of the clarified water from step (1), and in a gas-liquid separation zone flashing off a light gaseous fraction; removing a clear substantially water stream from said gas-liquid separation zone and introducing said clear substantially water stream to said gas-scrubbing zone to scrub the effluent gas stream from the gas generator; cooling said light gaseous fraction and separating therefrom uncondensed light gases, water, and partially water soluble liquid hydrocarbon compounds.

9. The process of claim 1 provided with the step of mixing supplemental light liquid hydrocarbon fuel make-up with the liquid organic extractant in step (1).

10. The process of claim 1 wherein said hydrocarbonaceous fuel is selected from the group consisting of various petroleum distillates and residue, whole crude, fuel oil, reduced crude; coal tar oil; shale oil; tar sand oil and mixtures thereof.

11. The process of claim 1 wherein said slurries of solid carbonaceous fuels are selected from the group lignite, bituminous coal, anthracite coal, and particulate carbon in water or liquid hydrocarbon fuels.

* * * * *